United States Patent [19]

Samhaber

[11] Patent Number: 4,749,456

[45] Date of Patent: Jun. 7, 1988

[54] ELECTROLYTIC RECOVERY OF COPPER FROM WASTE WATER

[75] Inventor: Wolfgang Samhaber, Basel, Switzerland

[73] Assignee: Sandoz Ltd., Basel, Switzerland

[21] Appl. No.: 82,874

[22] Filed: Aug. 6, 1987

Related U.S. Application Data

[63] Continuation of Ser. No. 927,471, Nov. 6, 1986, which is a continuation of Ser. No. 511,799, Jul. 7, 1983, abandoned, which is a continuation of Ser. No. 305,151, Sep. 24, 1981, abandoned.

[30] Foreign Application Priority Data

Sep. 29, 1980 [DE] Fed. Rep. of Germany ....... 3036684

[51] Int. Cl.$^4$ .............................................. C25F 5/00
[52] U.S. Cl. ................................. 204/130; 204/106; 204/149; 204/273; 204/275

[58] Field of Search ............... 204/130, 149, 106–108, 204/273, 275

[56] References Cited

U.S. PATENT DOCUMENTS 2,110,930  3/1938  Doffin ................................ 204/130
3,419,901  12/1968  Nordblom ......................... 204/10
3,450,622  6/1969  Cothran ............................ 204/109

*Primary Examiner*—R. L. Andrews
*Attorney, Agent, or Firm*—Gerald D. Sharkin; Robert S. Honor; Walter F. Jewell

[57] ABSTRACT

An electrolytic cell which has at least one three-dimensional cathode of non-galvanizable material, which cell is useful in removing metal ions or complexed metals from industrial waste water for example such as produced in the production and use of complex metal dyestuffs.

1 Claim, 2 Drawing Sheets

ELECTROLYTIC RECOVERY OF COPPER FROM WASTE WATER

This is a continuation of application Ser. No. 927,471, filed Nov. 6, 1986, which in turn is a continuation of application Ser. No. 511,799, filed July 7, 1983, now abandoned which in turn is a continuation of application Ser. No. 305,151, filed Sept. 24, 1981, now abandoned.

The present invention concerns an apparatus and a process for removing and recovering metals, in particular heavy metals, from aqueous liquids.

The growing stringency of environmental protection requirements has led to an increasing importance being attached to the removal and recovery of metals, especially heavy metals, from aqueous liquids, in particular industrial waste water, which contain metal ions or complexed metal.

Various techniques have previously been employed to purify such liquids including biological, chemical and electrochemical methods. Previously employed electrochemical techniques have included monopolar and bipolar fixed and fluidized bed type systems, cells containing diaphragms or membranes and others. None of these, however, have proven sufficiently efficient or economical when used on an industrial scale.

Conventional waste water treatment plants have not until now been capable of removing heavy metals, which are often complexed (i.e. in non-ionic form) in sufficient quantities. In addition the presence of such metals in effluent can severely disturb subsequent biological treatment processes and pre-treatment at source is thus highly desirable.

Conventional method of chemical precipitation of metals from aqueous liquids, filtration, drying and disposal has also proved unsatisfactory for highly complexed heavy metals.

It is the purpose of the present invention therefore to provide a method for substantially removing metals from aqueous liquids containing them as ions or in complex form and recovering the metal thus removed, and an apparatus for carrying out such a method.

The invention therefore concerns a monopolar electrolytic cell comprising one or more two-dimensional anodes and one or more three-dimensional cathodes, wherebythe cathodes have a large inner free volume ratio open in all directions and a high specific surface ratio and are made of a non-galvanizable material, and the cell is provided with a means for removing the thus precipitated metal.

By non-galvanizable materials are meant materials which are not galvanized (or electroplated) by the metal reduced in the cell when in operation and which exhibit a sufficiently high hydrogen-overpotential to achieve electrochemical reduction of the metal. Examples of such materials are stainless steels such as martensitic hardenable chrome steels, ferritic non-heat-treatable chrome steels or austenitic non-heat-treatable chrome-nickel steels.

Preferably each cathode comprises one or more, perforated containers charged with commercially available, technical packing material. Examples of such packing materials are stainless steel or steelplate hollow cylinders, certain parts of the surface of which can be cut and recessed, or other such ring shaped bodies. Packing materials of this type are commercially available e.g. as Pall®- or Raschig-rings and as Inter-pack®. The specific surface ratio is the ratio between surface area and volume.

Anodes are preferably made from graphite and require little or no maintenance.

Particularly suitable means for removing and recovering the finely divided reduced metal are those which do not materially affect or interupt the operation of the apparatus, for example hydraulic sluicing means.

The cell according to the invention is especially suitable for continuous operation and as such can be provided at the top and bottom of the cell chamber with in- and outlets. Flow can be in either direction and is preferably reversible.

Continuous operation can be facilitated by a particularly preferred embodiment of the invention wherein, to provide means for removing the metal, the floor of the cell is funnel-shaped and provided with a closable outlet at its lowest point through which the powdered or slurried metal precipitate can be sluiced, for example, by sudden evacuation of the cell chamber and if required subsequent rinsing.

In order to further increase the degree of precipitation of the metal it can be advantageous to charge the cathode containers with packing of varying specific surface ratios in such a way that the specific surface ratio increases with the flow of liquid or in other words that the specific surface ratio increases as the concentration of metal in the liquid decreases. This maximization of recovery can also be achieved by having a series of cells, the cathodes of which are charged with packing the specific surface ratio of which increases from cell to cell. This known procedure can be adapted to the particular conditions.

The cross section of each cell will be governed largely by the cross section of the cathode (container) which is chosen to achieve maximum useful volume.

Increased capacity can be provided by increasing the anodes (horizontal expansion) and corresponding broadening of the cathode (container) or adding further cathode/anode units to each cell. In order to increase the degree of precipitation in each cell the depth of each cell—and correspondingly the height of anode and cathode—can be increased. A number of individual cells in series can also be employed. These measures which are well known in the art can be employed to optimize and adjust each cell to the particular circumstances encountered.

The main advantage of the apparatus of the present invention over previous such electrolytic cells is that the metal produced by reduction at the cathode is in the form of small, loose particles which do not adhere to or galvanize the cathode itself and which are however large enough to settle in the apparatus.

As electrolysis proceeds the particles accumulate as a powder or slurry within the packing material and can easily be removed, for example, by a simple downward flow of liquid from the cell chamber particularly if this occurs as a sudden sluicing. This obviates the need to remove and discharge each individual cathode which was present in previously known cells. Furthermore, the presence of a membrane or diaphragm as required in some previously known cells is unnecessary.

The electrolytic cell according to the invention is particularly well suited for handling liquids with a conductivity of at least 100 mS/cm. Both acidic and alkaline liquids can be treated. When the liquids contain chlorine ions, either chlorine is generated at the anode or in alkaline solutions hypochlorite ions are formed.

This hypochlorite is capable of degrading a series of organic substances which, particularly in the case of waste water from the production of dyestuffs, represents an additional highly desirable effect.

The invention in addition concerns a process for removal and recovery of metals from aqueous liquids containing them as ions or in complexed form which comprises treating said liquids in a cell substantially as described above.

Examples of metals which may be removed and recovered according to the invention are copper, zinc, cadmium, cobalt, nickel, lead and for example, silver or gold.

A particular embodiment of the invention is described hereinafter with reference to the drawings.

Figure 1:
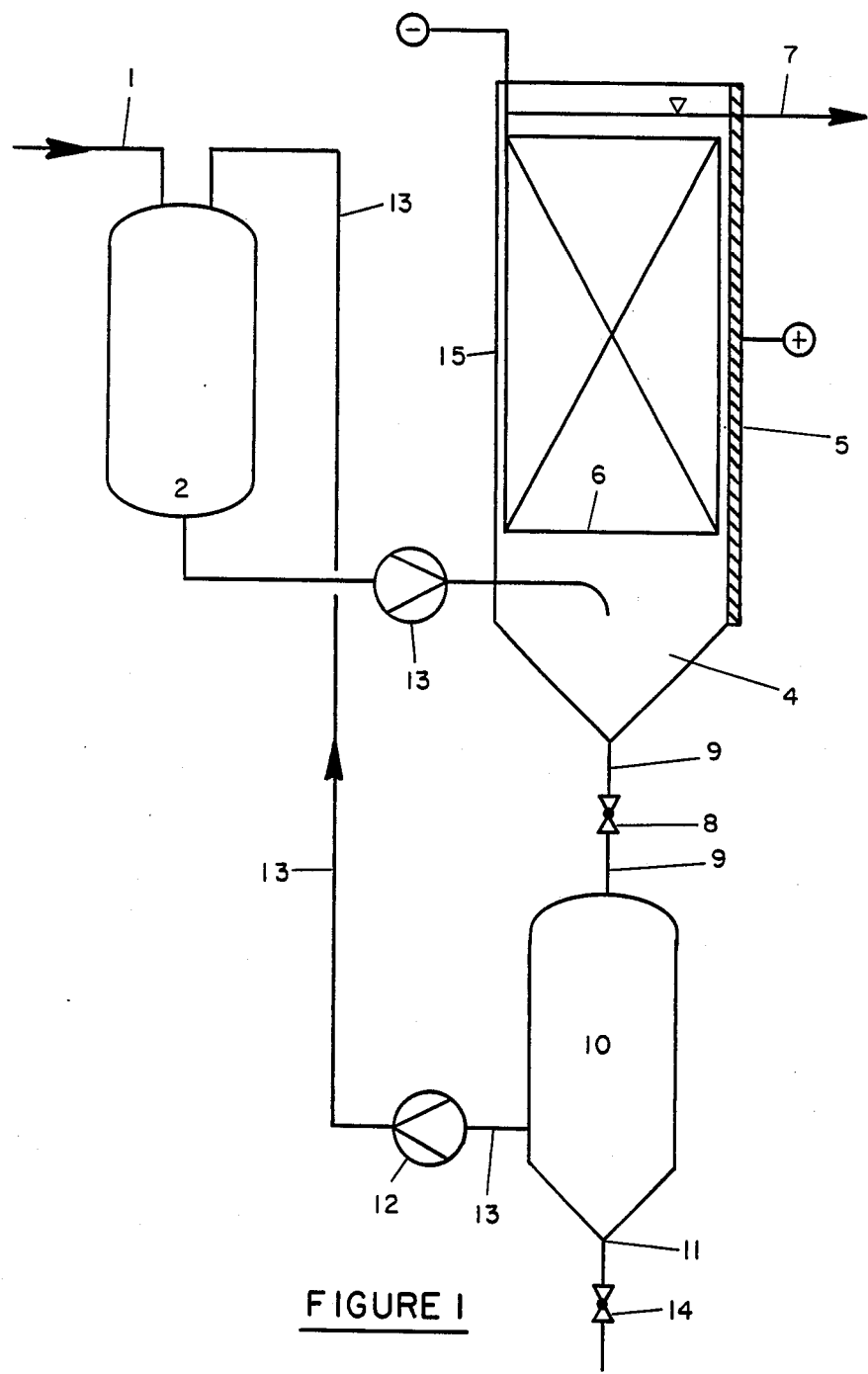
FIG. 1 shows, in schematic form, an installation in conformity with the invention.

The installation comprises a supply vessel 2 which receives liquid via pipe 1. This vessel is connected through a feed pump 3 to the lower funnel shaped base 4 of the cell chamber 15. The cell is provided with an anode 5 and a cathode represented by 6. Liquid is led away from the top of the cell via outlet 7. The cell is connected at the base of its funnel shaped portion via a pipe 9—which is of large diameter and is provided with a tap 8—to a settling vessel 10 which is itself provided with an outlet 11 and tap 14. The settling vessel 10 is reconnected with the supply vessel 2 via a pipe 13 and a pump 12. Current for the electrodes is provided by a conventional electrical source (not shown) and the installation is mounted in conventional manner.

In operation the metal containing liquid is led into the supply vessel 2 via pipe 1 and is pumped into the base 4 of the cell 15 by pump 3. The liquid then rises up the cell chamber past the anode 5 and through the cathode 6 where the metal is reduced and precipitates. Excess liquid is led off via outlet 7 for further processing. When sufficient metal has precipitated in the cathode 6 the pump 3 is switched off and tap 8 is opened. This causes the liquid in the cell to rapidly empty thus sluicing a quantity of the precipitated metal out of the cathode and into the settling vessel 10 tap 14 of which is closed. The empty cell is then rinsed through from above to carry the remaining metal into the settling vessel. Tap 8 is then closed and pump 3 restarted to continue the process. The precipitated and drawn off metal is allowed to settle in the vessel 10 whereafter the excess liquid is returned to the supply vessel 2 via pipe 13 and pump 12 and the metal drawn off via pipe 11 and tap 14.

Figures 2, 3:
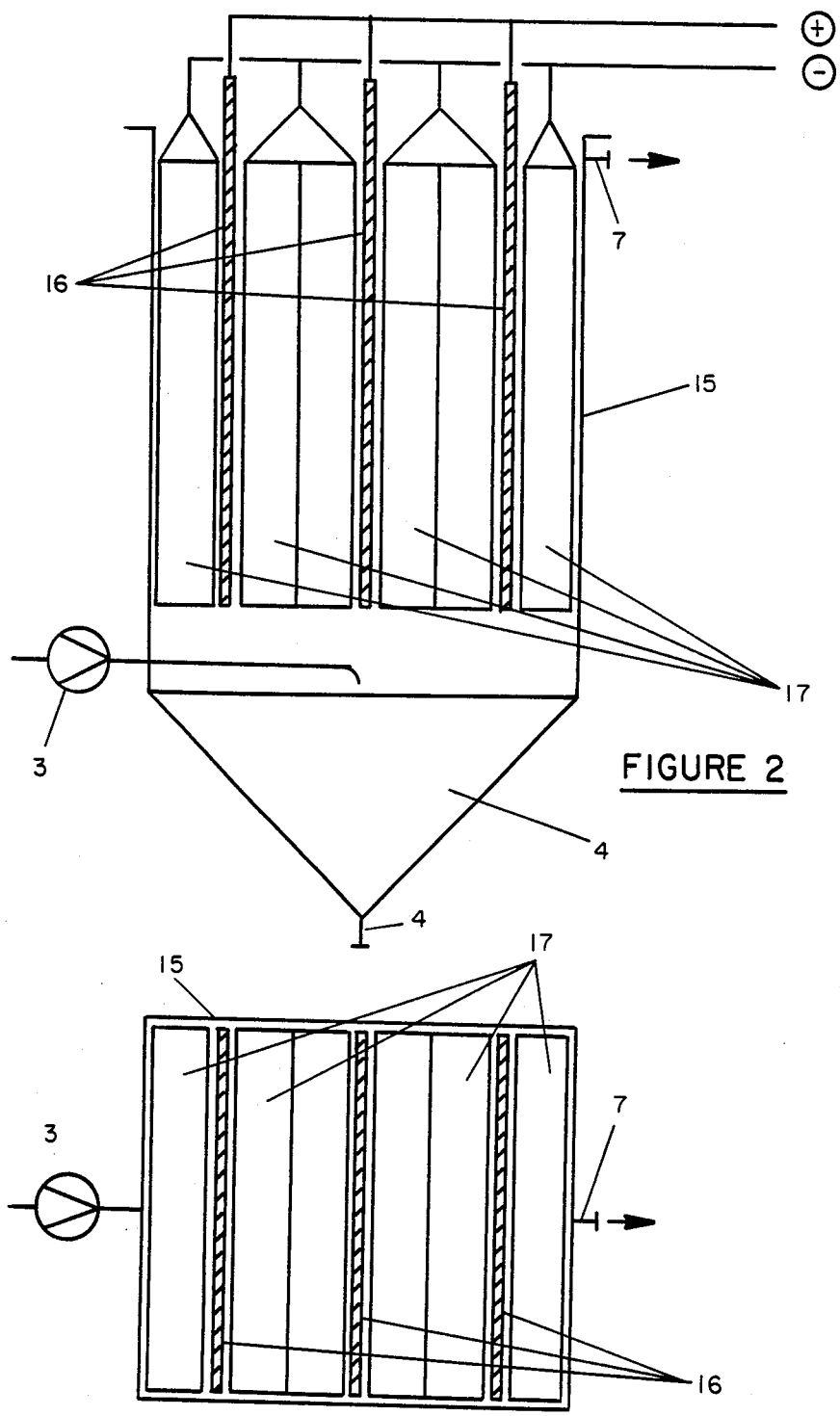
FIGS. 2 and 3 show respectively longitudinal and cross sections through a typical cell showing the cathode/anode arrangement.

In FIGS. 2 and 3 the cell chamber 15 is provided with three anodes 16 and four perforated cathode (containers) 17 which are charged with packing such as hereinbefore described. The symbols 3, 4, 7 and 9 represent the same as in FIG. 1.

The following example illustrates the invention.

EXAMPLE

Using a cell according to the invention waste water from the production of azo-dyes containing complexed copper at a concentration of between 1 and 5 g/l was treated at a pH of ca.9. The cell voltage was ca. 3 volt.

The copper content of liquid emerging from the cell after treatment had been reduced to 0.1 g/l which corresponds to a reduction of between 90 and 98%. The copper dye content of the original waste water was reduced to such an extent that a 10 cm layer of the originally dark almost completely opaque solution became pellucid.

The cell according to the invention is particularly suited for treating waste water from the production and use of metal complex dyestuffs.

I claim:

1. A method for reducing the concentration of complexed copper in waste water from the production of azo-dyes from about 1 to 5 g/l of copper to about 0.1 g/l of copper, by subjecting the waste water at a pH of about 9 in an electrolytic cell having a stainless steel electrode, to a cell voltage of about 3 volts and removing the deposited copper from about the electrode by mechanically detaching the metal by hydraulic sluicing.

* * * * *